US012211252B2

(12) United States Patent
Guo et al.

(10) Patent No.: US 12,211,252 B2
(45) Date of Patent: Jan. 28, 2025

(54) IMAGE PROCESSING METHOD, READABLE MEDIUM AND ELECTRONIC DEVICE

(71) Applicant: Beijing Volcano Engine Technology Co., Ltd., Beijing (CN)

(72) Inventors: Fubo Guo, Beijing (CN); Yihan Lian, Beijing (CN); Xiaodong Su, Beijing (CN); Minglei Li, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/759,626

(22) Filed: Jun. 28, 2024

(65) Prior Publication Data

US 2025/0005905 A1   Jan. 2, 2025

(30) Foreign Application Priority Data

Jun. 29, 2023   (CN) .......................... 202310788305.2

(51) Int. Cl.
*G06V 10/771*   (2022.01)
*G06T 1/00*   (2006.01)
(Continued)

(52) U.S. Cl.
CPC .......... *G06V 10/771* (2022.01); *G06T 1/0021* (2013.01); *G06T 5/40* (2013.01); *G06V 10/44* (2022.01); *H04N 1/6002* (2013.01)

(58) Field of Classification Search
CPC .... G06V 10/771; G06V 10/44; G06T 1/0021; G06T 5/40; H04N 1/6002; H04N 1/32144; H04N 1/3232–32347; H04N 21/8358
See application file for complete search history.

(56) References Cited

U.S. PATENT DOCUMENTS

| 10,236,006 | B1 * | 3/2019 | Gurijala | G10L 19/02 |
| 2009/0167870 | A1 * | 7/2009 | Caleca | H04N 1/00244 348/211.3 |
| 2016/0057317 | A1 * | 2/2016 | Zhao | H04N 21/8358 348/515 |

FOREIGN PATENT DOCUMENTS

| CN | 103177415 A | * | 6/2013 |
| CN | 110569627 A | | 12/2019 |

(Continued)

OTHER PUBLICATIONS

Bhowmik, Deepayan, Matthew Oakes, and Charith Abhayaratne. "Visual attention-based image watermarking." IEEE Access 4 (2016): 8002-8018. (Year: 2016).*

(Continued)

*Primary Examiner* — Shefali D Goradia
(74) *Attorney, Agent, or Firm* — BakerHostetler

(57) ABSTRACT

The present disclosure relates to an image processing method, readable medium and electronic device. The method comprises: acquiring a watermark image, wherein the watermark image is an image embedded with a foreground watermark, and the foreground watermark is generated by watermark information; determining a first image channel embedded with the foreground watermark and a second image channel not embedded with the foreground watermark in the watermark image, and determining a channel difference feature map of the watermark image according to channel information of the first image channel and channel information of the second image channel; performing feature enhancement processing on the channel difference feature map to obtain a first watermark enhanced feature map of the watermark image, wherein the first watermark enhanced feature map is used for extracting the watermark information of the watermark image.

20 Claims, 4 Drawing Sheets

(51) Int. Cl.
    *G06T 5/40*          (2006.01)
    *G06V 10/44*        (2022.01)
    *H04N 1/60*         (2006.01)

(56) References Cited

FOREIGN PATENT DOCUMENTS

| WO | WO-2005059830 A1 * | 6/2005 | ........... | G06T 1/0028 |
| WO | WO-2019193070 A1 * | 10/2019 | ........... | G10L 19/008 |

OTHER PUBLICATIONS

Park, Jaesik, Yu-Wing Tai, and In So Kweon. "Identigram/watermark removal using cross-channel correlation." 2012 IEEE Conference on Computer Vision and Pattern Recognition. IEEE, 2012. (Year: 2012).*

Guo, Hengchang, et al. "Practical deep dispersed watermarking with synchronization and fusion." Proceedings of the 31st ACM International Conference on Multimedia. 2023. (Year: 2023).*

* cited by examiner

| Method | Direct Extraction | After Watermark Enhancement |
|---|---|---|
| Extraction Success rate | 33% | 90% |

IMAGE PROCESSING METHOD, READABLE MEDIUM AND ELECTRONIC DEVICE

CROSS-REFERENCE TO RELATED APPLICATIONS

This application is based on and claims the benefit of priority to the Chinese patent application No. 202310788305.2 filed on Jun. 29, 2023, which is incorporated herein by reference in its entirety.

TECHNICAL FIELD

The present disclosure relates to the technical field of image processing, in particular to an image processing method, readable medium and electronic device.

BACKGROUND

With the rapid development of Internet technology, a large number of multimedia content items such as pictures are broadcast on the Internet every day. If pictures with confidential information are posted to public social media without authorization, it will pose a great security threat to information security.

SUMMARY

This Summary section is provided to introduce concepts in a brief form, which will be described in detail in the detailed description section below. This Summary section is not intended to identify key features or essential features of the claimed technical solution, nor is it intended to limit the scope of the claimed technical solution.

In a first aspect, the present disclosure provides an image processing method, which comprises:
  acquiring a watermark image, wherein the watermark image is an image embedded with a foreground watermark, and the foreground watermark is generated by watermark information;
  determining a first image channel embedded with the foreground watermark and a second image channel not embedded with the foreground watermark in the watermark image, and determining a channel difference feature map of the watermark image according to channel information of the first image channel and channel information of the second image channel; and
  performing feature enhancement processing on the channel difference feature map to obtain a first watermark enhanced feature map of the watermark image, wherein the first watermark enhanced feature map is used for extracting the watermark information of the watermark image.

In a second aspect, the present disclosure provides a computer-readable medium on which a computer program is stored, which, when executed by a processing apparatus, implements the steps of the method described in any one of the first aspect.

In a third aspect, the present disclosure provides an electronic device, comprising:
  a storage apparatus on which a computer program is stored;
  a processing apparatus for executing the computer program in the storage apparatus to implement the steps of the method in any one of the first aspect.

Other features and advantages of the present disclosure will be described in detail in the detailed description section that follows.

BRIEF DESCRIPTION OF THE DRAWINGS

The above and other features, advantages, and aspects of embodiments of the present disclosure will become more apparent by referring to the following detailed description when taken in combination with the accompanying drawings. Throughout the drawings, the same or similar reference signs refer to the same or similar elements. It should be understood that the drawings are schematic and that the originals and elements are not necessarily drawn to scale. In the accompanying drawings.

DETAILED DESCRIPTION

Figure 1:
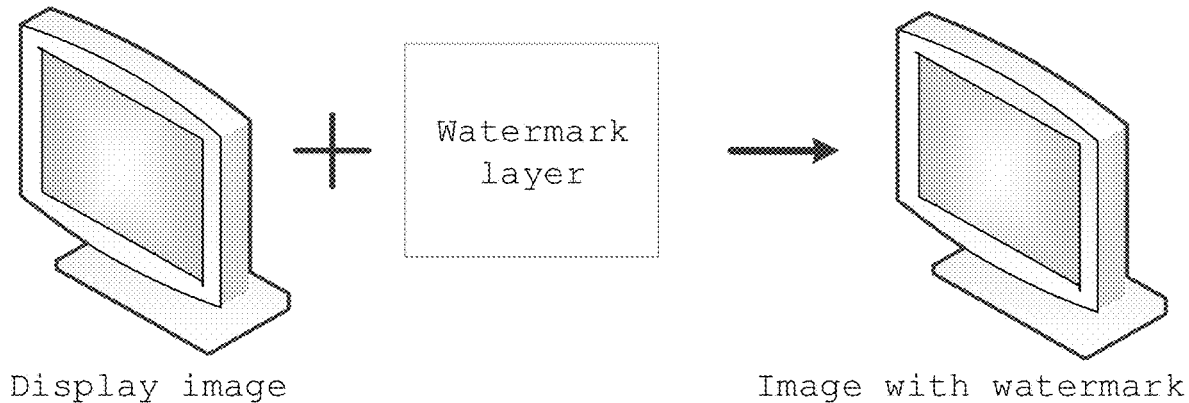
FIG. 1 is a schematic diagram of an embedded foreground watermark provided according to an exemplary embodiment of the present disclosure.

Embodiments of the present disclosure will be described in more detail below with reference to the accompanying drawings. Although certain embodiments of the present disclosure are shown in the drawings, it should be understood that the present disclosure may be embodied in various forms and should not be construed as limited to the embodiments set forth herein, but rather these embodiments are provided for a more complete and thorough understanding of the present disclosure. It should be understood that the drawings and embodiments of the present disclosure are for illustration purposes only and are not intended to limit the scope of the disclosure.

It should be understood that the various steps recited in the method embodiments of the present disclosure may be performed in a different order, and/or performed in parallel. Moreover, the method embodiments may include additional steps and/or omit performing the illustrated steps. The scope of the present disclosure is not limited in this respect.

The term "comprise" and variations thereof as used herein are intended to be open-ended, i.e., "comprise but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different apparatuses, modules or units, and are not used for limiting the order of functions performed by the devices, modules or units or interdependence thereof.

It should be noted that "a" or "a plurality of" mentioned in the present disclosure are intended to be illustrative rather than limiting, and those skilled in the art will appreciate that unless otherwise clearly indicated in the context, they should be understood as "one or more".

The names of messages or information exchanged between apparatuses in the embodiments of the present disclosure are for illustrative purposes only, and are not intended to limit the scope of the messages or information.

It may be understood that, prior to the implementation of the technical solutions disclosed in the embodiments of the present disclosure, users shall be informed of the type, the range of use, the scenarios of use, etc. of personal information related to the present disclosure in a proper manner in accordance with relevant laws and regulations, and authorization of the users shall be obtained.

For example, in response to the receipt of a user's proactive request, prompt information is sent to the user to explicitly prompt the user that the requested operation to be performed would require acquisition and use of personal information of the user. Accordingly, the user can autonomously select whether to provide personal information to software or hardware, such as an electronic device, an application program, a server or a storage medium that performs the operations of the technical solution of the present disclosure, according to the prompt information.

As an optional but non-limiting implementation manner, in response to the receipt of a user's proactive request, sending the prompt information to the user may take the form of, for example, a pop-up window, and the prompt information may be presented in a text manner in the pop-up window. In addition, a selection control for the user to choose to "agree" or "disagree" the presentation of personal information to the electronic device can be further carried in the pop-up window.

It may be understood that the above process of notification and acquisition of a user's authorization is only illustrative and is not intended to limit the implementation manner of the present disclosure, and other manners satisfying the relevant laws and regulations may also be applied to the implementation of the present disclosure.

Meanwhile, it may be understood that the data involved in this technical solution, including but not limited to the data itself should comply with the requirements of the applicable laws and regulations and related rules.

Digital watermarking technology is a technology to hide secret information in a carrier object, which is mainly used for copyright protection of digital products and tracing the source of information leakage. Its carrier can be digital image, video, audio and so on. According to whether the watermark is visible to an naked eye, the watermark can be divided into visible watermark and invisible watermark. Digital watermark uses the redundancy of data to embed specific identification information into carrier content, which can mark the copyright ownership, author information and so on of digital content. If the digital product is at risk of being infringed and leaked, the copyright owner can obtain the embedded copyright information through digital watermarking, so as to trace the source of leakage and the infringer of the digital product.

With the rapid development of Internet technology, a large number of multimedia content items such as pictures are broadcast on the Internet every day. If pictures with confidential information are posted to public social media without authorization, it will pose a great security threat to information security. Digital watermarking technology is an important means to trace the source of leakage of multimedia information such as pictures. Once the pictures with confidential information are leaked by means of screenshots, the source of the leakage can be located through the leaked pictures, so as to trace the responsibility of confidential leakage.

In the related technology, foreground watermark is a carrier-independent anti-leakage watermarking technology, also known as screen foreground watermark or screen watermark, which belongs to invisible watermark. Foreground watermark can be applied to devices such as monitors and notebook computers that may display confidential information, and embedded into the foreground of display devices through transparent layers. In the specific application process, the information needed for tracing, including device ID, user ID, timestamp and other information, is uniformly coded to generate a unique watermark ID (watermark encoding), and the watermark ID is generated into a transparent watermark layer with a fixed size according to a watermark embedding algorithm. Then the transparent watermark layer is embedded into the foreground of the display device in a tiled way, and the display content of the device is used as the background to realize the embedding of the watermark. In this process, the content of the watermark layer is not limited by the display content, and the display content does not need to participate in the generation of the watermark layer. As shown in FIG. 1, the final display content on the device screen is the superposition of the watermark layer and the display content.

Furthermore, in the process of foreground watermark extraction, the watermark image embedded with a watermark layer (such as a screen capture image) is input into a watermark extraction algorithm, and the watermark ID extracted by the watermark extraction algorithm can trace the source of leakage. However, the extraction effect of foreground watermark is affected by the display content, which will interfere with the watermark layer. For example, when the screen display content is a natural image with complex color and texture, it is difficult to ensure the success rate of extracting watermark.

In related art, digital watermarking technology is an important means to trace the source of leakage of multimedia information such as pictures, in which foreground watermark is a carrier-independent anti-leakage watermarking technology. However, because the content displayed on the screen will interfere with the foreground watermark, it is difficult to ensure the success rate of watermark extraction.

In view of this, the embodiments of the present disclosure provide an image processing method, apparatus, readable medium and electronic device, which can enhance the watermark features of a watermark image, reduce the interference of other image content items of the watermark image except the foreground watermark on the foreground watermark, and in this way more attention can be paid to the watermark features in the subsequent watermark extraction, thereby improving the extraction success rate of watermark extraction. Especially for the watermark image obtained when the content displayed on the screen is a natural image with complex color and texture, the success rate of watermark extraction can be effectively improved.

The embodiments of the present disclosure will be further explained with reference to the accompanying drawings.

Figure 2:
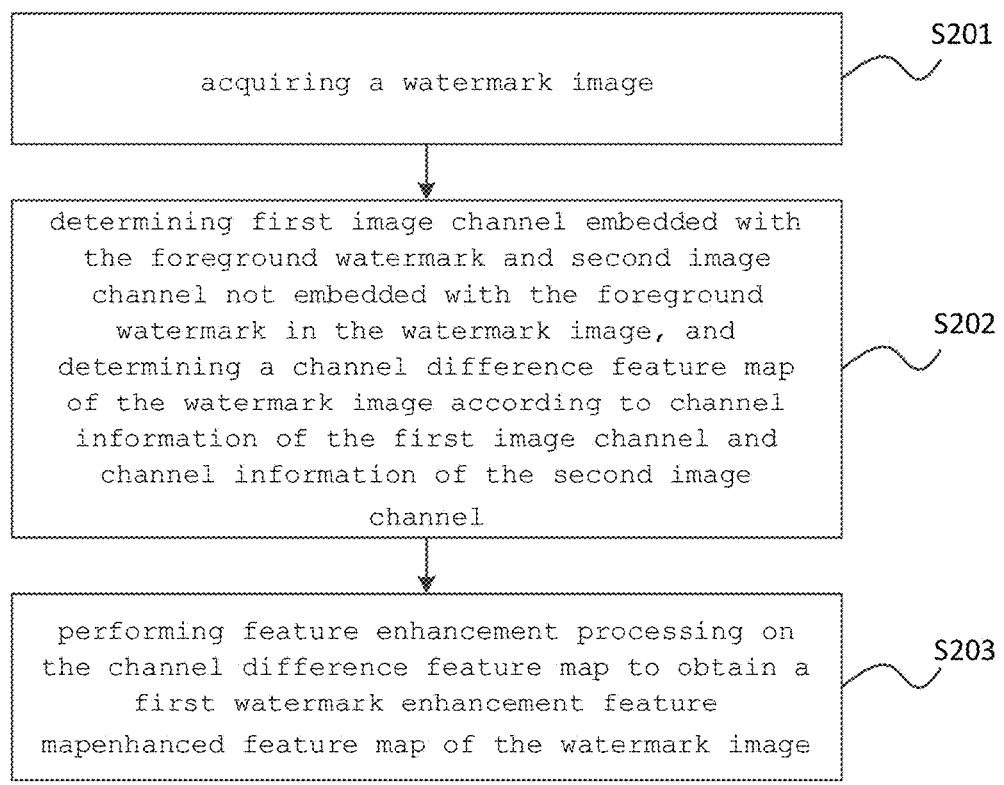
FIG. 2 is a schematic diagram of an image processing method provided according to an exemplary embodiment of the present disclosure.

FIG. 2 is a schematic diagram of an image processing method provided according to an exemplary embodiment of the present disclosure. Referring to FIG. 2, the method includes: S201, acquiring a watermark image.

Wherein, the watermark image is an image embedded with a foreground watermark, and the foreground watermark is generated by watermark information.

S202, determining a first image channel embedded with the foreground watermark and a second image channel not embedded with the foreground watermark in the watermark image, and determining a channel difference feature map of the watermark image according to channel information of the first image channel and channel information of the second image channel.

It should be noted that in the related art, in the embedding process of foreground watermark, one color channel is usually selected in the RGB (tricolors) color space as the watermark channel, and the watermark layer will only be embedded in the selected color channel, and other color channels are not affected by the watermark layer. For example, a foreground watermark algorithm first encodes a binary watermark (consisting of 0 and 1) to generate a watermark layer. In the watermark layer, there are differences between the regions representing 0 and 1, and the content of the watermark layer is only related to the watermark encoding and is not affected by the display content of the screen. The watermark layer is embedded into the color channel selected in the RGB color space by the way of foreground layer, thus realizing the embedding of the watermark.

Therefore, the watermark features of the watermark image can be enhanced by the channel difference between the image channel with the foreground watermark embedded and the image channel without the foreground watermark embedded.

In a possible way, the watermark image is a tricolor channel image, and determining a first image channel embedded with the foreground watermark and a second image channel not embedded with the foreground watermark in the watermark image may include: taking a channel embedded with the foreground watermark in the tricolor channel image as the first image channel; setting a channel value of each pixel point in the tricolor channel image in the first image channel to zero to obtain a first image, and performing color space conversion on the first image to obtain a second image including a brightness channel, and taking the brightness channel in the second image as the second image channel.

It should be understood that the foreground watermark algorithm in the above example embeds the color channels in the tricolor space, so the obtained watermark image is a tricolor channel image. If the initial watermark image is not a tricolor channel image, it can be converted into tricolor color space through color space conversion, and then the subsequent image processing flow is carried out. In addition, if other foreground watermark algorithms are used to embed the image into channels in other color spaces, the watermark image can also be images in other color spaces, and the channel embedded with the foreground watermark is taken as the first image channel, which is not specifically limited in the present disclosure.

For example, take the channel embedded with the foreground watermark in the tricolor channel image being the channel X (i.e. the watermark channel) as an example for illustration, the channel X is taken as the first image channel, and then the channel value of each pixel point in the tricolor channel image in the first image channel is set to zero, for example, the RGB channel value of a pixel point is (x, y, z), where x is the channel value of the channel X, and the RGB channel value of the pixel point after setting to zero is (0, y, z). After processing each pixel point, the first image is obtained. It should be understood that the first image is an image with all information of the watermark channel erased.

For example, color space conversion is performed on the first image to obtain a second image including a brightness channel, for example, it can be converted into a YUV channel image, and similarly, it can also be a channel image including a brightness channel such as a Y'UV channel image, a YCbCr channel image, a YPbPr channel image, etc. For details, please refer to related technologies, and the present disclosure does not limit this. Where Y represents brightness, and channel Y can be used as the second image channel.

In a possible way, the watermark image includes a plurality of pixel points, and determining a channel difference feature map of the watermark image according to channel information of the first image channel and channel information of the second image channel may include: for each pixel point, determining a first channel value of the pixel point in the first image channel and a second channel value of the pixel point in the second image channel, and determining a difference value between the first channel value and the second channel value; determining a channel difference feature map of the watermark image according to a plurality of difference values corresponding to the plurality of pixel points, wherein a feature value corresponding to each pixel point in the channel difference feature map is a difference value corresponding to the pixel point.

For example, for each pixel in the watermark image, the first channel value of the pixel point in the first image channel and the second channel value of the pixel point in the second image channel are determined, and then the difference value between the first channel value and the second channel value is determined, and then the difference value is used as the feature value of the pixel point, whereby the channel difference feature map of the watermark image is determined according to a plurality of differences corresponding to the plurality of pixel points.

S203, performing feature enhancement processing on the channel difference feature map to obtain a first watermark enhanced feature map of the watermark image.

Wherein the first watermark enhanced feature map is used for extracting the watermark information of the watermark image.

For example, after the channel difference feature map is obtained, feature enhancement processing can be performed to enhance the watermark features in the watermark image, so that more attention can be paid to the watermark features in the subsequent watermark extraction, thereby improving the accuracy and success rate of watermark extraction.

In a possible way, performing feature enhancement processing on the channel difference feature map to obtain a first watermark enhanced feature map of the watermark image may comprise: normalizing the channel difference feature map to obtain the first watermark enhanced feature map of the watermark image.

It should be understood that because the distribution range of the difference values calculated from each pixel point is large, the difference values corresponding to all pixel points can be normalized, and the data can be normalized to an integer in the interval of [0, 255] to obtain the first watermark enhanced feature map of the watermark image.

For example, the feature value corresponding to each pixel point in the channel difference feature map of the watermark image is the difference value corresponding to the pixel point, and the channel difference feature map of the watermark image is normalized to obtain the first watermark enhanced feature map of the watermark image, wherein the feature value corresponding to each pixel point in the first watermark enhanced feature map of the watermark image is an integer in the interval of [0, 255].

It is worth noting that the above process of determining the first watermark enhanced feature map is actually to enhance the color channel where the foreground watermark is located, and take other color channels without the foreground watermark as prior knowledge to suppress the content irrelevant to the foreground watermark in the watermark channel, thus enhancing the intensity of watermark features in the watermark image and reducing the interference of complex texture in the natural image on extracting watermark information.

In a possible way, the first watermark enhanced feature map comprises a plurality of pixel points, and the method can further comprise: acquiring a feature value of each pixel point in the first watermark enhanced feature map, and determining a feature threshold according to a plurality of feature values corresponding to the plurality of pixel points; performing binarization processing according to a numerical relationship between the feature value of each pixel point and the feature threshold in the first watermark enhanced feature map to obtain a second watermark enhanced feature map of the watermark image, wherein the second watermark enhanced feature map is used for extracting the watermark information of the watermark image.

It should be noted that the first watermark enhanced feature map of the watermark image is binarized, so that the binary value of the first watermark enhanced feature map with different feature value distributions has only two feature values of 0 and 1, which resembles the watermark layer with only two codes of 0 and 1. Affected by the display content in the background of the device, the regions representing 0 and 1 codes in the watermark image will change accordingly, and the influence of this display content on the watermark layer can be weakened by binarization.

For example, the feature value of each pixel point in the first watermark enhanced feature map can be obtained, and the feature value histogram can be counted, and the feature threshold can be determined based on the feature histogram, for example, the average value and weighted average of all feature values can be selected as the feature threshold, which can be specifically set according to requirements, and the present disclosure does not limit it. Further, the feature value of each pixel point in the first watermark enhanced feature map is compared with the feature threshold. The feature value less than the feature threshold is set to 0, and the feature value greater than or equal to the feature threshold is set to 1, and so on, to obtain the second watermark enhanced feature map of the watermark image.

In addition, in image processing, a natural image has similar characteristics in pixel values in local areas, so more detailed features can be obtained by blocking the natural image to obtain the local features of the foreground watermark, which can not only improve the image recognition rate, but also accelerate the image processing efficiency.

Therefore, in a possible way, determining a feature threshold according to a plurality of feature values corresponding to the plurality of pixel points may include: dividing the first watermark enhanced feature map according to a preset size to obtain a plurality of sub-feature maps; for each of the plurality of sub-feature maps, determining a sub-feature threshold corresponding to the sub-feature map according to feature values of pixel points in the sub-feature map.

For example, the preset size can be set according to experience and requirements, which is not limited by the present disclosure. According to the preset size, the first watermark enhanced feature map is divided. If the size of the first watermark enhanced feature map is not divisible according to the preset size, the indivisible part can be cut off to obtain a plurality of sub-feature maps. If the size of the first watermark enhanced feature map is smaller than the preset size, it is not divided. Then, the feature value histogram is counted for each sub-feature map, and the sub-feature threshold corresponding to the sub-feature map is determined according to the feature value histogram.

Further, performing binarization processing according to a numerical relationship between the feature value of each pixel point and the feature threshold in the first watermark enhanced feature map to obtain a second watermark enhanced feature map of the watermark image may include: for each sub-feature map, performing binarization processing according to a numerical relationship between a feature value of each pixel point in the sub-feature map and the sub-feature threshold corresponding to the sub-feature map to obtain a target sub-feature map; determining the second watermark enhanced feature map of the watermark image according to a plurality of target sub-feature maps.

Among them, the binarization process of the sub-feature map can refer to the binarization process of the first watermark enhanced feature map, and the present disclosure will not repeat it here.

In a possible way, for each sub-feature map, determining a sub-feature threshold corresponding to the sub-feature map according to feature values of pixel points in the sub-feature map may comprise: for each sub-feature map, performing the following operations: determining a pixel histogram according to feature values of each pixel point in the sub-feature map; determining a preset number of target feature values with the largest distribution quantities in the pixel histogram and a distribution quantity of each target feature value in the pixel histogram; for each target feature value, determining a ratio of a distribution quantity corresponding to the target feature value to a total distribution quantity corresponding to the preset number of target feature values, and taking the ratio as a weight value of the target feature value; calculating a weighted average based on the preset number of target feature values and the weight value corresponding to the preset number of target feature values, and taking the weighted average as a sub-feature threshold corresponding to the sub-feature map.

For example, for the pixel histogram corresponding to each sub-feature map, a preset number of feature values with the highest heights, that is, a preset number of target feature values with the largest distribution quantities, are counted. For example, the preset number is 2, the weighted average can be calculated as the sub-feature threshold corresponding to the sub-feature map by the following calculation formula:

$$avg = \frac{h1}{h1 + h2} \times p1 + \frac{h2}{h1 + h2} \times p2$$

Where avg represents a weighted average, p1 and p2 represent two target feature values with the largest distribution quantities, h1 represents a distribution quantity corresponding to p1, and h2 represents a distribution quantity corresponding to p2. Moreover, the process of determining the feature threshold of the first watermark enhanced feature map is consistent with the process of determining the sub-feature value of the sub-feature map.

It is worth noting that the above process of determining the second watermark enhanced feature map can further enhance the watermark features of the watermark image.

By adopting the above method, the interference of other image contents of the watermark image except the foreground watermark on the foreground watermark is reduced by extracting the channel difference feature map of the watermark image, and then the first watermark enhanced feature map is obtained through the feature enhancement process, and the features can be further enhanced by binarization processing to obtain a second watermark enhanced feature map, so that more attention can be paid to the watermark feature part in the subsequent watermark extraction, thereby improving the accuracy and success rate of watermark extraction. Especially for the watermark image obtained when the content displayed on the screen is a natural image with complex color and texture, the success rate of watermark extraction can be effectively improved.

Through the above technical solutions, firstly, a watermark image is obtained, then a first image channel embedded with a foreground watermark and a second image channel not embedded with a foreground watermark in the watermark image are determined, and a channel difference feature map of the watermark image is determined according to channel information of the first image channel and channel information of the second image channel, and finally, the channel difference feature map is subjected to feature enhancement processing to obtain a first watermark enhanced feature map of the watermark image. By adopting the above method, the watermark features of the watermark image can be enhanced, and the interference of other image content items of the watermark image except the foreground watermark on the foreground watermark can be reduced, so that more attention is paid to the watermark features in the subsequent watermark extraction, thereby improving the extraction success rate of watermark extraction.

Figure 3:
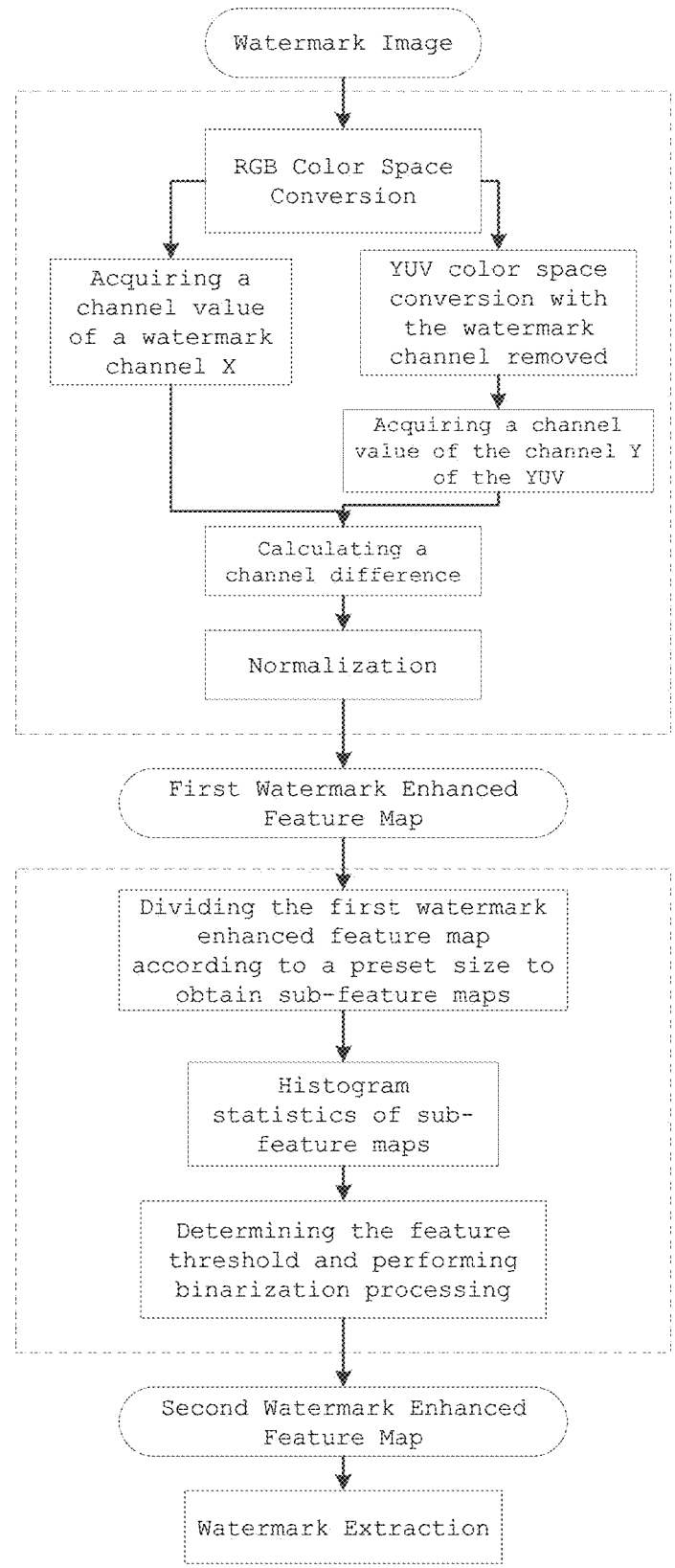
FIG. 3 is a schematic diagram of another image processing method provided according to an exemplary embodiment of the present disclosure.

FIG. 3 is a flow diagram of an image processing method according to an exemplary embodiment of the present disclosure. Referring to FIG. 3, after obtaining the watermark image, if the watermark embedding channel of the watermark image is inconsistent with the current color space of the watermark image, color space conversion can be performed, such as RGB color space conversion. Then, the channel value of the watermark channel X is obtained, and YUV color space conversion is performed on the image after the watermark channel is removed, and then the channel value of the channel Y is obtained, so that the channel difference values between the watermark channel X and the channel Y are calculated, and the first watermark enhanced feature map is obtained after normalization processing. The first watermark enhanced feature map is divided according to a preset size to obtain at least one sub-feature map, and histogram statistics is made on the sub-feature map, then the feature threshold is determined based on the histogram, and binarization processing is performed according to the numerical relationship between the feature value corresponding to each pixel point and the feature threshold in the sub-feature map to obtain a second watermark enhanced feature map, which is used for extracting the watermark information of the watermark image.

It should be understood that the first watermark enhanced feature map can be selected to extract the watermark information of the watermark image, or the second watermark enhanced feature map can be selected to extract the watermark information of the watermark image. For example, for a natural image with more complex color and texture, the second watermark enhanced feature map can be selected to obtain more watermark features, which is convenient for extracting the watermark information of the watermark image. Generally speaking, the more watermark features, the higher the accuracy and success rate of watermark extraction, but the more computing resources are needed in the image processing process to obtain watermark features. Therefore, whether the first watermark enhanced feature map or the second watermark enhanced feature map is used for extracting the watermark information of the watermark image can be selected according to the requirements, and the present disclosure does not specifically limit this.

For example, a watermark extraction algorithm can be used to extract the watermark from the watermark enhanced feature map (which can be the first watermark enhanced feature map or the second watermark enhanced feature map, hereinafter collectively referred to as the watermark enhanced feature map), and the watermark extraction algorithm is determined based on the watermark embedding algorithm, which is not specifically limited by the present disclosure. A watermark extraction model can also be used to extract the watermark from the watermark enhanced feature map, and the watermark extraction model can be a pre-trained deep learning model, a convolutional neural network model, etc., and the present disclosure does not specifically limit this.

Figures 4, 5:
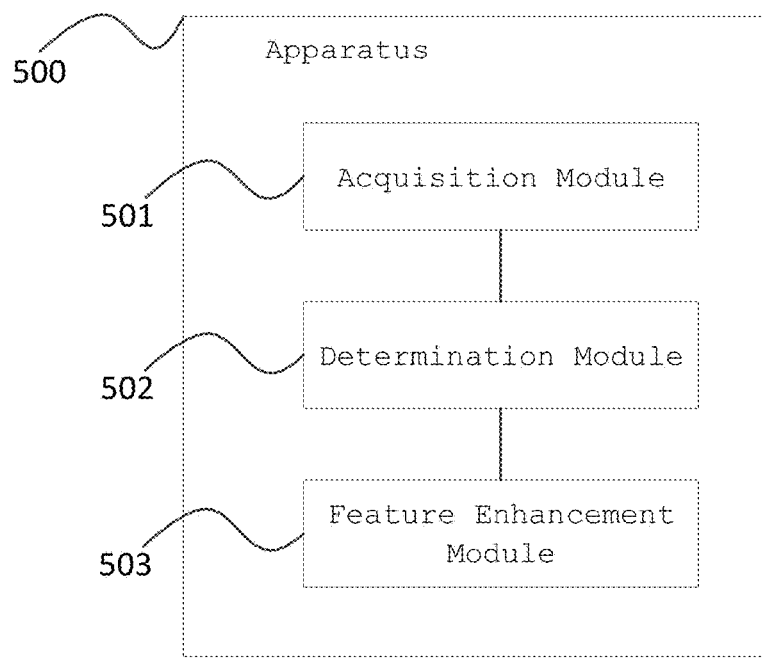
FIG. 4 is a schematic diagram for comparing extraction success rates of watermark extraction after image processing and direct watermark extraction provided according to an exemplary embodiment of the present disclosure.
FIG. 5 is a block diagram of an image processing apparatus provided according to an exemplary embodiment of the present disclosure.

It is worth noting that the watermark enhanced feature map of the watermark image obtained by the above image processing method enhances the watermark feature of the watermark image, and reduces the interference of other image contents of the watermark image except the foreground watermark on the foreground watermark, thus making the watermark extraction algorithm or watermark extraction model pay more attention to the watermark feature part, and further improving the accuracy and success rate of watermark extraction. Especially for the watermark image obtained when the content displayed on the screen is a natural image with complex color and texture, the accuracy and success rate of watermark extraction can be effectively improved. Referring to FIG. 4, in practical application, compared with the direct watermark extraction of the watermark image, the success rate of watermark extraction is significantly improved by watermark extraction of the watermark enhanced feature map of the watermark image obtained by the above image processing method.

Based on the same inventive concept, an embodiment of the present disclosure provides an image processing apparatus. The image processing apparatus comprises:
    an acquisition module, configured to acquire a watermark image, wherein the watermark image is an image embedded with a foreground watermark, and the foreground watermark is generated by watermark information;
    a determination module, configured to determine a first image channel embedded with the foreground watermark and a second image channel not embedded with the foreground watermark in the watermark image, and determine a channel difference feature map of the watermark image according to channel information of the first image channel and channel information of the second image channel;
    a feature enhancement module, configured to perform feature enhancement processing on the channel difference feature map to obtain a first watermark enhanced feature map of the watermark image, wherein the first watermark enhanced feature map is used for extracting the watermark information of the watermark image.

FIG. 5 illustrates an image processing apparatus according to some embodiments of the present disclosure. As shown in FIG. 5, the apparatus 500 comprises:

an acquisition module 501, configured to acquire a watermark image, wherein the watermark image is an image embedded with a foreground watermark, and the foreground watermark is generated by watermark information.

a determination module 502, configured to determine a first image channel embedded with the foreground watermark and a second image channel not embedded with the foreground watermark in the watermark image, and determine a channel difference feature map of the watermark image according to channel information of the first image channel and channel information of the second image channel.

a feature enhancement module 503, configured to perform feature enhancement processing on the channel difference feature map to obtain a first watermark enhanced feature map of the watermark image.

wherein the first watermark enhanced feature map is used for extracting the watermark information of the watermark image.

Optionally, the watermark image includes a plurality of pixel points, and the determination module 502 comprises:

a first determination sub-module, configured to determine, for each pixel point, a first channel value of the pixel point in the first image channel and a second channel value of the pixel point in the second image channel, and determine a difference value between the first channel value and the second channel value;

a second determination sub-module, configured to determine the channel difference feature map of the watermark image according to a plurality of difference values corresponding to the plurality of pixel points, wherein a feature value corresponding to each of the plurality of pixel points in the channel difference feature map is a difference value corresponding to the pixel point.

Optionally, the feature enhancement module 503 is configured to:

perform normalization processing on the channel difference feature map to obtain a first watermark enhanced feature map of the watermark image.

Optionally, the first watermark enhanced feature map comprises a plurality of pixel points, and the apparatus 500 further comprises:

a feature threshold determination module, configured to acquire a feature value of each pixel point in the first watermark enhanced feature map, and determine a feature threshold according to the plurality of feature values corresponding to the plurality of pixel points;

a binarization processing module, configured to perform binarization processing according to a numerical relationship between the feature value of each pixel point and the feature threshold in the first watermark enhanced feature map to obtain a second watermark enhanced feature map of the watermark image, wherein the second watermark enhanced feature map is used for extracting the watermark information of the watermark image.

Optionally, the feature threshold determination module is configured to:

divide the first watermark enhanced feature map according to a preset size to obtain a plurality of sub-feature maps;

for each of the plurality of sub-feature maps, determine a sub-feature threshold corresponding to the sub-feature map according to feature values of pixel points in the sub-feature map;

The binarization processing module is configured to:

for each of the plurality of sub-feature maps, perform binarization processing according to a numerical relationship between a feature value of each pixel point and the sub-feature threshold in the sub-feature map corresponding to the sub-feature map to obtain a target sub-feature map;

determine the second watermark enhanced feature map of the watermark image according to a plurality of target sub-feature maps.

Optionally, the feature threshold determination module is configured to:

for each of the plurality of sub-feature maps, perform the following operations:

determining a pixel histogram according to a feature value of each pixel point in the sub-feature map;

determining a preset number of target feature values with the largest distribution quantities in the pixel histogram and a distribution quantity of each target feature value in the pixel histogram;

for each target feature value, determining a ratio of a distribution quantity corresponding to the target feature value to a total distribution quantity corresponding to the preset number of target feature values, and taking the ratio as a weight value of the target feature value;

calculating a weighted average based on the preset number of target feature values and the weight value corresponding to the preset number of target feature values, and taking the weighted average as the sub-feature threshold corresponding to the sub-feature map.

Optionally, the watermark image is a tricolor channel image, and the determination module is configured to:

take the channel embedded with the foreground watermark in the tricolor channel image as the first image channel;

set a channel value of each pixel point in the tricolor channel image in the first image channel to zero to obtain a first image, and perform color space conversion on the first image to obtain a second image including a brightness channel, and take the brightness channel in the second image as the second image channel.

With regard to the apparatus in the above embodiment, the specific way that each module performs operations has been described in detail in the embodiment of the method, and will not be described in detail here.

Based on the same concept, the embodiments of the present disclosure also provide a computer-readable medium, on which a computer program is stored, which, when executed by a processing apparatus, implements the steps of the above image processing method.

Based on the same concept, the embodiments of the present disclosure also provide an electronic device, comprising:

a storage apparatus on which a computer program is stored;

a processing apparatus for executing the computer program in the storage apparatus to implement the steps of the image processing method.

Figure 6:
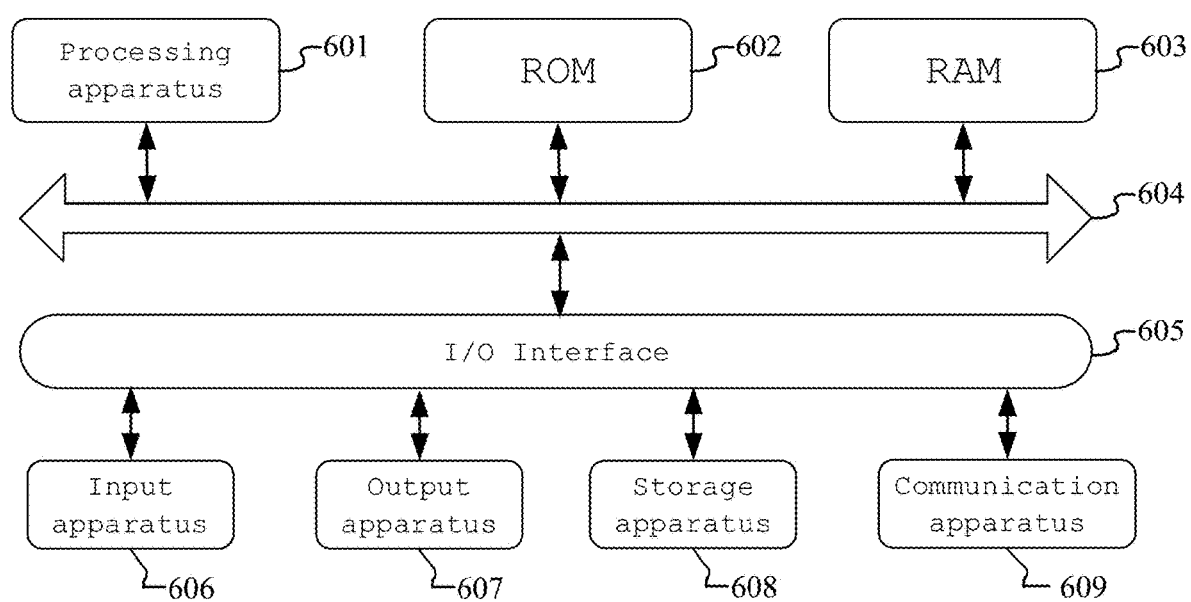
FIG. 6 is a schematic structural diagram of an electronic device provided according to an exemplary embodiment of the present disclosure.

Reference is now made to FIG. 6, which shows a structural schematic diagram suitable for implementing an electronic device 600 in an embodiment of the present disclosure. The electronic device in the embodiment of the present disclosure may include, but is not limited to, electronic devices such as mobile phones, notebook computers, PADs (tablet computers), desktop computers, and the like. The electronic device shown in FIG. 6 is only an example, and should not bring any limitation to the functions and the scope of the application of the embodiments of the present disclosure.

As shown in FIG. 6, the electronic device 600 may include a processing apparatus (e.g., a central processer, a graphics processor, etc.) 601 that may perform various appropriate actions and processes according to a program stored in a read-only memory (ROM) 602 or a program loaded from a storage apparatus 608 into a random access memory (RAM) 603. In the RAM 603, various programs and data necessary for the operation of the electronic device 600 are also stored. The processing apparatus 601, the ROM 602, and the RAM 603 are connected to each other via a bus 604. An input/output (I/O) interface 605 is also connected to the bus 604.

Generally, the following apparatus can be connected to the I/O interface 605: an input apparatus 606 including, for example, a touch screen, touch pad, keyboard, mouse, camera, microphone, accelerometer, gyroscope, etc.; an output apparatus 607 including, for example, a Liquid Crystal Display (LCD), speaker, vibrator, etc.; a storage apparatus 608 including, for example, magnetic tape, hard disk, etc.; and a communication apparatus 609. The communication apparatus 609 may allow the electronic device 600 to communicate with other devices wirelessly or by wire to exchange data. While FIG. 6 illustrates an electronic device 600 having various means, it is to be understood that it is not required to implement or provide all of the means shown. More or fewer means may be alternatively implemented or provided.

In particular, the processes described above with reference to the flow diagrams may be implemented as computer software programs, according to the embodiment of the present disclosure. For example, an embodiment of the present disclosure includes a computer program product comprising a computer program carried on a non-transitory computer readable medium, the computer program containing program code for performing the method illustrated by the flow diagram. In such an embodiment, the computer program may be downloaded and installed from the network via the communication apparatus 609, or installed from the storage apparatus 608, or installed from the ROM 602. When executed by the processing apparatus 601, the computer program performs the above-described functions defined in the method of the embodiments of the present disclosure.

It should be noted that the computer readable medium of the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage apparatus, a magnetic storage apparatus, or any suitable combination of the foregoing. In the present disclosure, a computer readable storage medium may be any tangible medium that contains, or stores a program for use by or in combination with an instruction execution system, apparatus, or device. In contrast, in the present disclosure, a computer readable signal medium may include a data signal propagated in a baseband or as a part of a carrier wave, wherein a computer readable program code is carried therein. Such a propagated data signal may take a variety of forms, including, but not limited to, an electro-magnetic signal, an optical signal, or any suitable combination thereof. A computer-readable signal medium may be any computer readable medium other than a computer-readable storage medium and the computer-readable signal medium can communicate, propagate, or transport a program for use by or in combination with an instruction execution system, apparatus, or device. Program code embodied on a computer-readable medium may be transmitted using any appropriate medium, including but not limited to: electrical wires, optical cables, RF (radio frequency), etc., or any suitable combination thereof.

In some embodiments, communication can be performed using any currently known or future-developed network protocol, such as HTTP (HyperText Transfer Protocol), and may be interconnected to digital data communication (e.g., a communication network) of any form or medium. Examples of communication networks include a local area network ("LAN"), a wide area network ("WAN"), the Internet (e.g., the Internet), and a peer-to-peer network (e.g., ad hoc peer-to-peer network), as well as any currently known or future developed network.

The computer readable medium may be included in the above-mentioned electronic device; or it may exist alone without being assembled into the electronic device.

The computer-readable medium carries one or more programs that, when executed by the electronic device, cause the electronic device to: acquire a watermark image, wherein the watermark image is an image embedded with a foreground watermark, and the foreground watermark is generated by watermark information; determine a first image channel embedded with the foreground watermark and a second image channel not embedded with the foreground watermark in the watermark image, and determine a channel difference feature map of the watermark image according to channel information of the first image channel and channel information of the second image channel; perform feature enhancement processing on the channel difference feature map to obtain a first watermark enhanced feature map of the watermark image, wherein the first watermark enhanced feature map is used for extracting the watermark information of the watermark image.

Computer program code for carrying out operations of the present disclosure may be written in one or more programming languages or a combination thereof, the programming languages include, but are not limited to an object oriented programming language such as Java, Smalltalk, C++, and also include conventional procedural programming languages, such as the "C" programming language, or similar programming languages. The program code can be executed entirely on the user's computer, partly on the user's computer, as an independent software package, partly on the user's computer and partly executed on a remote computer, or entirely on the remote computer or server. In the scenario involving a remote computer, the remote computer may be connected to the user's computer through any type of network, including a Local Area Network (LAN) or a Wide Area Network (WAN), or may be connected to an external computer (for example, through the Internet using an Internet service provider).

The flow diagrams and block diagrams in the figures illustrate the architecture, functionality, and operation that are possibly implemented by systems, methods and computer program products according to various embodiments of the present disclosure. In this regard, each block in the flow diagrams or block diagrams may represent a module, program segment, or portion of code, which comprises one or more executable instructions for implementing the specified logical function(s). It should also be noted that, in some alternative implementations, the functions noted in the blocks may occur in an order different from that noted in the figures. For example, two blocks shown in succession may, in fact, be executed substantially concurrently, or they may sometimes be executed in a reverse order, depending upon the function involved. It will also be noted that each block of the block diagrams and/or flow diagrams, and a combination of blocks in the block diagrams and/or flow diagrams, can be implemented by special purpose hardware-based systems that perform the specified functions or operations, or combinations of special purpose hardware and computer instructions.

The modules described in the embodiments of the present disclosure may be implemented by software or hardware. Wherein the name of a module does not in some cases constitute a limitation on the module itself. For example, the acquisition module can also be described as "a module for acquiring a watermark image".

The functions described herein above may be performed, at least in part by one or more hardware logic components. For example, without limitation, exemplary types of hardware logic components that may be used include Field Programmable Gate Arrays (FPGAs), Application Specific Integrated Circuits (ASICs), Application Specific Standard Products (ASSPs), Systems on a Chip (SOCs), Complex Programmable Logic Devices (CPLDs), and so forth.

In the context of this disclosure, a machine readable medium may be a tangible medium that can contain, or store a program for use by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage apparatus, a magnetic storage apparatus, or any suitable combination of the foregoing.

The above descriptions are only preferred embodiments of the present disclosure and are illustrative of the principles of the technology employed. It will be appreciated by those skilled in the art that the scope of disclosure of the present disclosure is not limited to the technical solutions formed by specific combinations of the above-described technical features, and should also encompass other technical solutions formed by any combination of the above-described technical features or equivalents thereof without departing from the concept of the present disclosure. For example, the technical solutions formed by the above features be replaced with (but not limited to) features having similar functions disclosed in the present disclosure.

Further, although operations are depicted in a particular order, this should not be understood as requiring such operations to be performed in the particular order shown or in sequential order. Under certain circumstances, multitasking and parallel processing may be advantageous. Likewise, although several specific implementation details are included in the above discussion, these should not be construed as limitations on the scope of the present disclosure. Certain features that are described in the context of a single embodiment can also be implemented in combination in the single embodiment. Conversely, various features that are described in the context of a single embodiment can also be implemented in multiple embodiments separately or in any suitable subcombination.

Although the present subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims. With regard to the apparatus in the above embodiments, the specific manner in which each module performs an operation has been described in detail in the embodiment related to the method, and will not be described in detail here.

What is claimed is:

1. An image processing method, comprising:
    acquiring a watermark image, wherein the watermark image is an image embedded with a foreground watermark, and the foreground watermark is generated by watermark information;
    determining a first image channel embedded with the foreground watermark and a second image channel not embedded with the foreground watermark in the watermark image, and determining a channel difference feature map of the watermark image according to channel information of the first image channel and channel information of the second image channel; and
    performing feature enhancement processing on the channel difference feature map to obtain a first watermark enhanced feature map of the watermark image, wherein the first watermark enhanced feature map is used for extracting the watermark information of the watermark image.

2. The method according to claim 1, wherein the watermark image comprises a plurality of pixel points, and said determining a channel difference feature map of the watermark image according to channel information of the first image channel and channel information of the second image channel comprises:
    for each of the plurality of pixel point, determining a first channel value of the pixel point in the first image channel and a second channel value of the pixel point in the second image channel, and determining a difference value between the first channel value and the second channel value; and
    determining the channel difference feature map of the watermark image according to a plurality of difference values corresponding to the plurality of pixel points, wherein a feature value corresponding to each of the plurality of pixel points in the channel difference feature map is a difference value corresponding to the pixel point.

3. The method according to claim 2, wherein said performing feature enhancement processing on the channel difference feature map to obtain a first watermark enhanced feature map of the watermark image comprises:

normalizing the channel difference feature map to obtain the first watermark enhanced feature map of the watermark image.

4. The method according to claim 1, wherein the first watermark enhanced feature map comprises a plurality of pixel points, and the method further comprises:
acquiring a feature value of each of the plurality of pixel points in the first watermark enhanced feature map, and determining a feature threshold according to the feature values corresponding to the plurality of pixel points; and
performing binarization processing according to a numerical relationship between the feature value of each pixel point and the feature threshold in the first watermark enhanced feature map to obtain a second watermark enhanced feature map of the watermark image, wherein the second watermark enhanced feature map is used for extracting the watermark information of the watermark image.

5. The method according to claim 4, wherein said determining the feature threshold according to the feature values corresponding to the plurality of pixel points comprises:
dividing the first watermark enhanced feature map according to a preset size to obtain a plurality of sub-feature maps; and
for each of the plurality of sub-feature maps, determining a sub-feature threshold corresponding to the sub-feature map according to feature values of pixel points in the sub-feature map;
said performing binarization processing according to a numerical relationship between the feature value of each pixel point and the feature threshold in the first watermark enhanced feature map to obtain a second watermark enhanced feature map of the watermark image comprises:
for each of the plurality of sub-feature maps, performing binarization processing according to a numerical relationship between a feature value of each pixel point in the sub-feature map and the sub-feature threshold corresponding to the sub-feature map to obtain a target sub-feature map; and
determining the second watermark enhanced feature map of the watermark image according to a plurality of target sub-feature maps.

6. The method according to claim 5, wherein said for each of the plurality of sub-feature maps, determining the sub-feature threshold corresponding to the sub-feature map according to feature values of pixel points in the sub-feature map comprises:
for each of the plurality of sub-feature maps, performing the following operations:
determining a pixel histogram according to a feature value of each pixel point in the sub-feature map;
determining a preset number of target feature values with the largest distribution quantities in the pixel histogram and a distribution quantity of each target feature value in the pixel histogram;
for each target feature value, determining a ratio of a distribution quantity corresponding to the target feature value to a total distribution quantity corresponding to the preset number of target feature values, and taking the ratio as a weight value of the target feature value; and
calculating a weighted average based on the preset number of target feature values and the weight values corresponding to the preset number of target feature values, and taking the weighted average as the sub-feature threshold corresponding to the sub-feature map.

7. The method according to claim 1, wherein the watermark image is a tricolor channel image, and said determining the first image channel embedded with the foreground watermark and the second image channel not embedded with the foreground watermark in the watermark image comprises:
taking a channel embedded with the foreground watermark in the tricolor channel image as the first image channel; and
setting a channel value of each pixel point in the tricolor channel image in the first image channel to zero to obtain a first image, and performing color space conversion on the first image to obtain a second image including a brightness channel, and taking the brightness channel in the second image as the second image channel.

8. A non-transitory computer-readable medium on which a computer program is stored, wherein the program, when executed by a processing apparatus, implements the steps of the method comprising:
acquiring a watermark image, wherein the watermark image is an image embedded with a foreground watermark, and the foreground watermark is generated by watermark information;
determining a first image channel embedded with the foreground watermark and a second image channel not embedded with the foreground watermark in the watermark image, and determining a channel difference feature map of the watermark image according to channel information of the first image channel and channel information of the second image channel; and
performing feature enhancement processing on the channel difference feature map to obtain a first watermark enhanced feature map of the watermark image, wherein the first watermark enhanced feature map is used for extracting the watermark information of the watermark image.

9. The non-transitory computer-readable medium according to claim 8, wherein the watermark image comprises a plurality of pixel points, and said determining a channel difference feature map of the watermark image according to channel information of the first image channel and channel information of the second image channel comprises:
for each of the plurality of pixel point, determining a first channel value of the pixel point in the first image channel and a second channel value of the pixel point in the second image channel, and determining a difference value between the first channel value and the second channel value; and
determining the channel difference feature map of the watermark image according to a plurality of difference values corresponding to the plurality of pixel points, wherein a feature value corresponding to each of the plurality of pixel points in the channel difference feature map is a difference value corresponding to the pixel point.

10. The non-transitory computer-readable medium according to claim 9, wherein said performing feature enhancement processing on the channel difference feature map to obtain a first watermark enhanced feature map of the watermark image comprises:
normalizing the channel difference feature map to obtain the first watermark enhanced feature map of the watermark image.

11. The non-transitory computer-readable medium according to claim 8, wherein the first watermark enhanced feature map comprises a plurality of pixel points, and the method further comprises:
acquiring a feature value of each of the plurality of pixel points in the first watermark enhanced feature map, and determining a feature threshold according to the feature values corresponding to the plurality of pixel points; and
performing binarization processing according to a numerical relationship between the feature value of each pixel point and the feature threshold in the first watermark enhanced feature map to obtain a second watermark enhanced feature map of the watermark image, wherein the second watermark enhanced feature map is used for extracting the watermark information of the watermark image.

12. The non-transitory computer-readable medium according to claim 11, wherein said determining the feature threshold according to the feature values corresponding to the plurality of pixel points comprises:
dividing the first watermark enhanced feature map according to a preset size to obtain a plurality of sub-feature maps; and
for each of the plurality of sub-feature maps, determining a sub-feature threshold corresponding to the sub-feature map according to feature values of pixel points in the sub-feature map;
said performing binarization processing according to a numerical relationship between the feature value of each pixel point and the feature threshold in the first watermark enhanced feature map to obtain a second watermark enhanced feature map of the watermark image comprises:
for each of the plurality of sub-feature maps, performing binarization processing according to a numerical relationship between a feature value of each pixel point in the sub-feature map and the sub-feature threshold corresponding to the sub-feature map to obtain a target sub-feature map; and
determining the second watermark enhanced feature map of the watermark image according to a plurality of target sub-feature maps.

13. The non-transitory computer-readable medium according to claim 11, wherein said for each of the plurality of sub-feature maps, determining the sub-feature threshold corresponding to the sub-feature map according to feature values of pixel points in the sub-feature map comprises:
for each of the plurality of sub-feature maps, performing the following operations:
determining a pixel histogram according to a feature value of each pixel point in the sub-feature map;
determining a preset number of target feature values with the largest distribution quantities in the pixel histogram and a distribution quantity of each target feature value in the pixel histogram;
for each target feature value, determining a ratio of a distribution quantity corresponding to the target feature value to a total distribution quantity corresponding to the preset number of target feature values, and taking the ratio as a weight value of the target feature value; and
calculating a weighted average based on the preset number of target feature values and the weight values corresponding to the preset number of target feature values, and taking the weighted average as the sub-feature threshold corresponding to the sub-feature map.

14. The non-transitory computer-readable medium according to claim 11, wherein the watermark image is a tricolor channel image, and said determining the first image channel embedded with the foreground watermark and the second image channel not embedded with the foreground watermark in the watermark image comprises: taking a channel embedded with the foreground watermark in the tricolor channel image as the first image channel; and setting a channel value of each pixel point in the tricolor channel image in the first image channel to zero to obtain a first image, and performing color space conversion on the first image to obtain a second image including a brightness channel, and taking the brightness channel in the second image as the second image channel.

15. An electronic device, comprising:
a storage apparatus on which a computer program is stored; and
a processing apparatus for executing the computer program in the storage apparatus to implement the steps of the method comprising:
acquiring a watermark image, wherein the watermark image is an image embedded with a foreground watermark, and the foreground watermark is generated by watermark information;
determining a first image channel embedded with the foreground watermark and a second image channel not embedded with the foreground watermark in the watermark image, and determining a channel difference feature map of the watermark image according to channel information of the first image channel and channel information of the second image channel; and
performing feature enhancement processing on the channel difference feature map to obtain a first watermark enhanced feature map of the watermark image, wherein the first watermark enhanced feature map is used for extracting the watermark information of the watermark image.

16. The electronic device according to claim 15, wherein the watermark image comprises a plurality of pixel points, and said determining a channel difference feature map of the watermark image according to channel information of the first image channel and channel information of the second image channel comprises:
for each of the plurality of pixel point, determining a first channel value of the pixel point in the first image channel and a second channel value of the pixel point in the second image channel, and determining a difference value between the first channel value and the second channel value; and
determining the channel difference feature map of the watermark image according to a plurality of difference values corresponding to the plurality of pixel points, wherein a feature value corresponding to each of the plurality of pixel points in the channel difference feature map is a difference value corresponding to the pixel point.

17. The electronic device according to claim 16, wherein said performing feature enhancement processing on the channel difference feature map to obtain a first watermark enhanced feature map of the watermark image comprises:
normalizing the channel difference feature map to obtain the first watermark enhanced feature map of the watermark image.

18. The electronic device according to claim 15, wherein the first watermark enhanced feature map comprises a plurality of pixel points, and the method further comprises:

acquiring a feature value of each of the plurality of pixel points in the first watermark enhanced feature map, and determining a feature threshold according to the feature values corresponding to the plurality of pixel points; and performing binarization processing according to a numerical relationship between the feature value of each pixel point and the feature threshold in the first watermark enhanced feature map to obtain a second watermark enhanced feature map of the watermark image, wherein the second watermark enhanced feature map is used for extracting the watermark information of the watermark image.

19. The electronic device according to claim 18, wherein said determining the feature threshold according to the feature values corresponding to the plurality of pixel points comprises:

dividing the first watermark enhanced feature map according to a preset size to obtain a plurality of sub-feature maps; and for each of the plurality of sub-feature maps, determining a sub-feature threshold corresponding to the sub-feature map according to feature values of pixel points in the sub-feature map;

said performing binarization processing according to a numerical relationship between the feature value of each pixel point and the feature threshold in the first watermark enhanced feature map to obtain a second watermark enhanced feature map of the watermark image comprises:

for each of the plurality of sub-feature maps, performing binarization processing according to a numerical relationship between a feature value of each pixel point in the sub-feature map and the sub-feature threshold corresponding to the sub-feature map to obtain a target sub-feature map; and determining the second watermark enhanced feature map of the watermark image according to a plurality of target sub-feature maps.

20. The electronic device according to claim 19, wherein said for each of the plurality of sub-feature maps, determining the sub-feature threshold corresponding to the sub-feature map according to feature values of pixel points in the sub-feature map comprises:

for each of the plurality of sub-feature maps, performing the following operations:

determining a pixel histogram according to a feature value of each pixel point in the sub-feature map;

determining a preset number of target feature values with the largest distribution quantities in the pixel histogram and a distribution quantity of each target feature value in the pixel histogram;

for each target feature value, determining a ratio of a distribution quantity corresponding to the target feature value to a total distribution quantity corresponding to the preset number of target feature values, and taking the ratio as a weight value of the target feature value; and calculating a weighted average based on the preset number of target feature values and the weight values corresponding to the preset number of target feature values, and taking the weighted average as the sub-feature threshold corresponding to the sub-feature map.

* * * * *